No. 821,236. PATENTED MAY 22, 1906.
T. H. HABERKORN.
VALVE GEAR FOR ENGINES.
APPLICATION FILED DEC. 5, 1905.
3 SHEETS—SHEET 1.
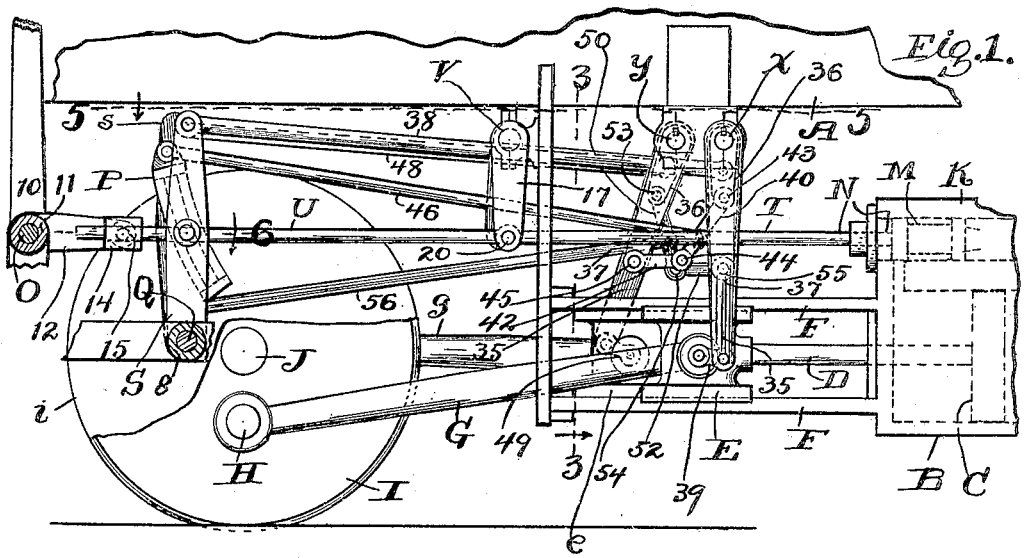
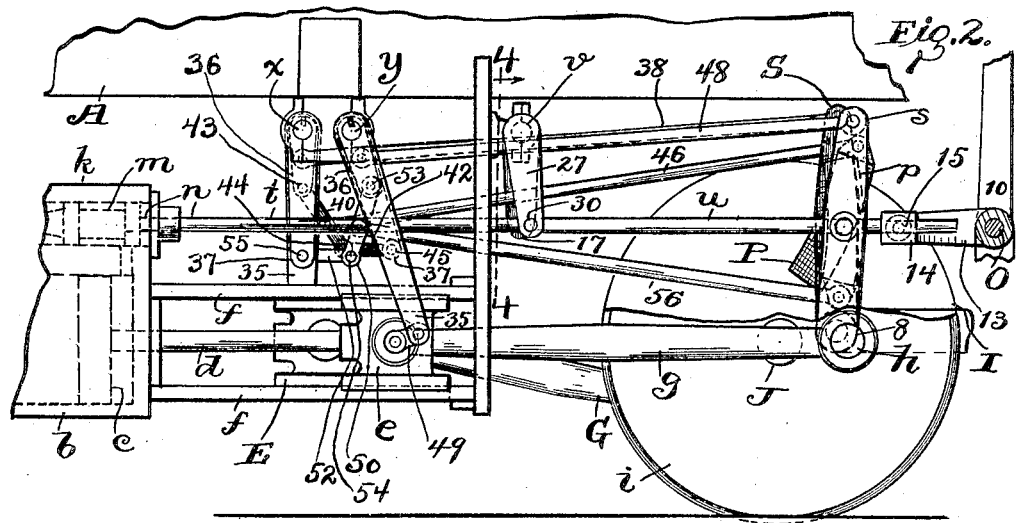
WITNESSES:
INVENTOR
Theodore H. Haberkorn
BY
ATTORNEYS

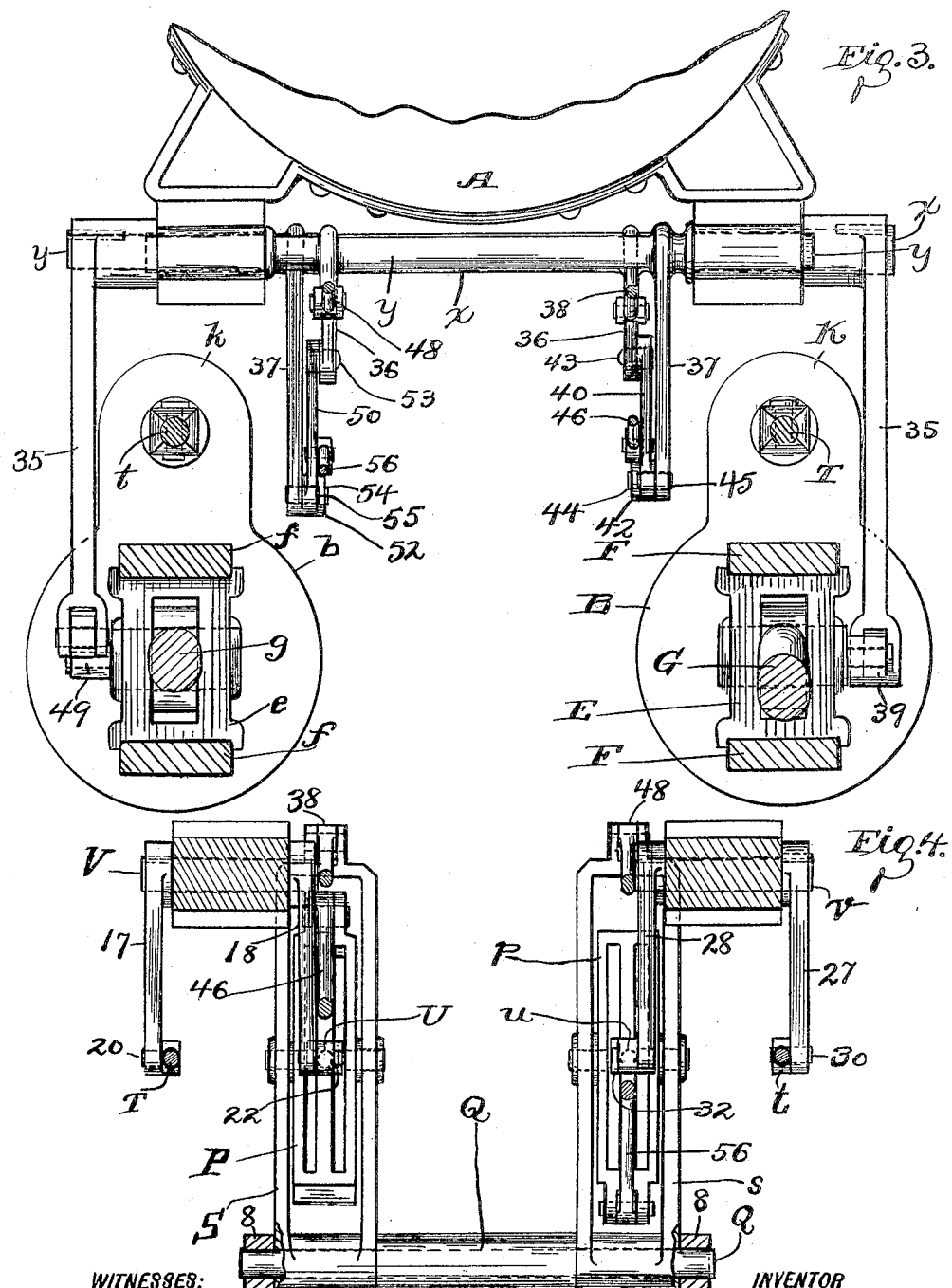

No. 821,236. PATENTED MAY 22, 1906.
T. H. HABERKORN.
VALVE GEAR FOR ENGINES.
APPLICATION FILED DEC. 5, 1905.
3 SHEETS—SHEET 3.
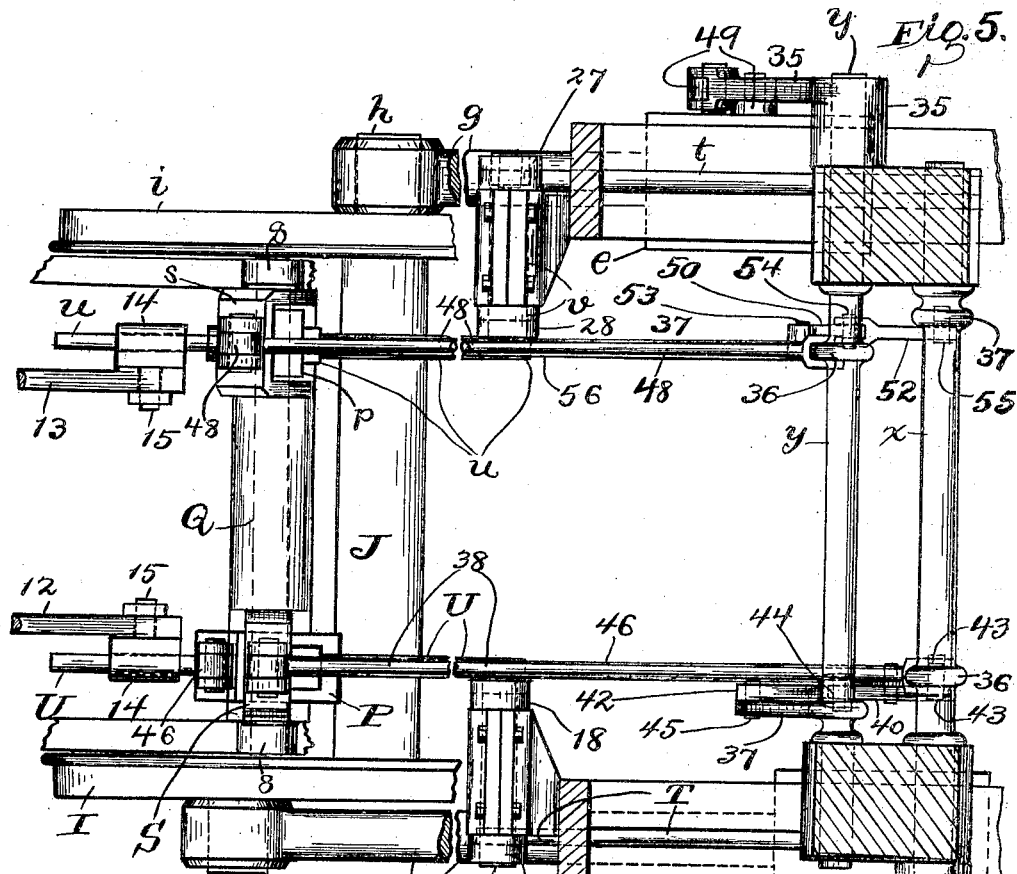
WITNESSES
Daniel E. Haly.
Victor C. Lynch.
INVENTOR
Theodore H. Haberkorn
BY
ATTORNEYS

UNITED STATES PATENT OFFICE.

THEODORE H. HABERKORN, OF FORT WAYNE, INDIANA.

VALVE-GEAR FOR ENGINES.

No. 821,236.  Specification of Letters Patent.  Patented May 22, 1906.

Application filed December 5, 1905. Serial No. 290,382.

*To all whom it may concern:*

Be it known that I, THEODORE H. HABERKORN, a citizen of the United States of America, residing at Fort Wayne, in the county of Allen and State of Indiana, have invented certain new and useful Improvements in Valve-Gears for Engines Operated by Fluid Under Pressure; and I hereby declare the following to be a full, clear, and exact description of the invention, such as will enable others skilled in the art to which it pertains to make and use the same.

This invention relates to improvements in valve-gears for engines operated by fluid under pressure, and pertains more especially to a reversible double steam-engine for a locomotive.

The primary object of this invention is to overcome the defects of valve-gears operated by eccentrics. The attachment of such eccentrics to the driving shaft or axle frequently causes trouble by heating and constantly disturbs the steam distribution, especially in locomotives where such axle never remains in alinement with the valve mechanism, which is attached to frames vibrating on springs. The depression of the springs and the lost motion of eccentrics, journal-bearings, and axle-boxes which are held loose between frames to permit the sliding motion caused by the springs make a valve-gear comprising eccentrics not only defective and wasteful in fuel consumption, but also expensive by frequent adjustments and repairs. The valve-gear or valve-motion is the life of an engine, and a defective valve-motion produces a defective engine.

Another object of my invention is to provide a valve-gear for steam-engines which is more especially designed for a double reversible engine, which is durable in construction, and economical and reliable in its operation.

With these objects in view this invention consists in certain features of construction and combination of parts hereinafter described, and pointed out in the claims.

In the accompanying drawings, Figures 1 and 2 are opposite side elevations of a valve-gear embodying my invention, which gear is shown applied in a locomotive. Fig. 3 is a vertical section on line 3 3, Fig. 1, looking in the direction indicated by the arrow. Fig. 4 is a vertical section on line 2 2, Fig. 2, looking in the direction indicated by the arrow. Figs. 5 and 6 are horizontal sections on line 5 5 and line 6 6, respectively, Fig. 1, looking downwardly. Figs. 3, 4, 5, and 6 are drawn on a larger scale than Figs. 1 and 2, and portions are broken away and in section in the drawings to reduce their size and to more clearly show the construction.

Referring to the drawings, A indicates the boiler of a locomotive. B and $b$ are two suitably-supported laterally-spaced parallel steam-cylinders arranged horizontally below the boiler at the right-hand side and left-hand side, respectively, of the locomotive. As shown in Fig. 1, C indicates the piston within the cylinder B, and D the rod of the piston C, which rod is rigid with a cross-head E, which engages and is adapted to slide endwise of slideways or guides F, arranged parallel with and of course externally of the cylinder B. The cross-head E is operatively connected by a pitman G with the crank-wrist H of the driving-wheel I on the shaft or axle J.

As shown in Fig. 2, $c$ represents the piston within the cylinder $b$, and $d$ the rod of the piston $c$, which rod is rigid with a cross-head $e$, which engages and is adapted to reciprocate endwise of suitably-formed slideways or girders $f$, arranged parallel with and externally of the cylinder $b$. The cross-head $e$ is operatively connected by a pitman $g$ with the crank-wrist $h$ of the driving-wheel $i$ on the shaft or axle J—that is, the wheels I and $i$ are arranged at opposite sides, respectively, of the locomotive and have power transmitted thereto from the pistons of the cylinders C and $c$, respectively. The piston of each cylinder and the means establishing operative connection between the said piston and the shaft or axle J have such arrangement relative to the piston of the other cylinder and the means establishing operative connection between the last-mentioned piston and the said shaft or axle that dead-points are avoided, that when the stroke of the piston of one cylinder is completed the piston of the other cylinder is at the middle of its stroke or position of greatest power.

As shown in Fig. 1, K indicates the steam-chest, arranged at the top of and rigid with the cylinder B, and M the reciprocating valve within the said chest, which valve is provided with a stem N, which is arranged parallel with the piston-rod D.

As shown in Fig. 2, $k$ represents the valve-chest, arranged at the top of and rigid with the cylinder $b$, and $m$ the reciprocating valve within the chest $k$. The valve $m$ is provided with a stem $n$, which is arranged parallel with the piston-rod $d$.

The cylinder and valve-chest at one side of the locomotive correspond in construction with the cylinder and valve-chest at the opposite side of the locomotive. The cylinders and valve-chests are supported in the usual manner, and of course the cylinders, valve-chests, and valves are so relatively arranged and ported that steam is admitted to opposite ends of each cylinder alternately during the operation of the engine.

Adjacent the wheels I and $i$, at an elevation between the shaft or axle J and the boiler A, as shown in Figs. 1 and 2, is arranged a reverse-shaft O, which is shown also in Fig. 4 and has bearing in relatively stationary boxes 11. The shaft O is operatively provided with an upright arm 10 for oscillating the said shaft, which arm is operatively connected in any approved manner with the reverse-lever. (Not shown.) The shaft O is provided with two parallel arms 12 and 13, which are spaced longitudinally of the shaft and project from the shaft in the direction of the valve-chests, and at the outer side of each of the said arms, at the free end of the respective arm, is arranged a block 14, which is pivoted horizontally to the said arm, as at 15. The blocks 14 are arranged with their axes parallel with and equidistantly from the shaft O.

Motion to the valves M and $m$ is transmitted through the medium of a link-motion. The link-motion employed in operating the valve M comprises an upright link P and a link-hanger S. The link-motion employed in operating the valve $m$ comprises an upright link $p$ and a link-hanger $s$. The two links P and $p$ are arranged and spaced laterally below the boiler A in suitable proximity to the reverse-shaft O.

A rod T is connected with the stem N of the valve M and extends from the said stem in the direction of the link P, (see Fig. 1,) and a radius-rod U is arranged longitudinally between and connected with the valve-rod T and the said link. The connection between the rods T and U (see Figs. 1, 4, and 5) comprises a suitably-supported rocker-shaft V, which is arranged above the said rods and horizontally and parallel with the reverse-shaft O. The shaft V is provided with two depending arms 17 and 18. The valve-rod T is pivoted, as at 20, to the shaft-arm 17. The radius-rod U is pivoted, as at 22, to the shaft-arm 18. The pivotal connections between the rods T and U and the shaft-arms 17 and 18 are arranged parallel with the shaft V.

A rod $t$ is connected with the stem $n$ of the valves $m$ and extends from the said stem in the direction of the link $p$, (see Fig. 2,) and a radius-rod $u$ is arranged longitudinally between and connected with the valve-rod $t$ and the said link. The connection between the rods $t$ and $u$ (see Figs. 2, 4, and 5) comprises a suitably-supported rocker-shaft $v$, which is arranged above the said rods and horizontally and parallel with the reverse-shaft O. The shaft $v$ is provided with two depending arms 27 and 28. The valve-rod $t$ is pivoted, as at 30, to the shaft-arm 27. The radius-rod $u$ is pivoted, as at 32, to the shaft-arm 28. The pivotal connections between the rods $t$ and $u$ and the shaft-arms 27 and 28 are arranged parallel with the shaft $v$. The shafts V and $v$ are arranged in line endwise.

The connection between each of the links P and $p$ and the engaging radius-rod (see Fig. 6) comprises a sliding block 23, which is adjustable endwise (up and down) of the said link and engages a slideway or guide 24, with which the said link is provided, which guide extends from the upper end to the lower end of the link, and the said radius-rod is pivoted to the connected link-block, as at 25, and slotted, as at 26, to accommodate the location and operation of the said link-block.

The link P is pivoted centrally between its upper and lower ends to the link-hanger S, and the link $p$ is pivoted centrally between its upper and lower ends to the link-hanger $s$.

The two link-hangers S and $s$ are journaled upon an axle Q, which has bearing in relatively stationary boxes 8. (Shown in section in Figs. 1, 2, and 4.) The boxes 8 and 11 are rigid with or form members of the frames of the locomotive; but such frames are not illustrated in the drawings, because the framework of a locomotive is too well known in the art to require illustration and description, and illustration thereof would merely interfere with a satisfactory disclosure of my improved valve-gear.

The hangers S and $s$ are arranged with their axes coincident and parallel with the shafts O, V, and $v$, and the pivotal connections between the links P and $p$ and the hangers S $s$ are parallel with the axes of the hangers.

The radius-rod U (see Figs. 5 and 6) extends loosely through the block 14 of the shaft-arm 12, so as to establish operative connection between the block 23 of the link P and the reverse-shaft O. The radius-rod $u$ extends loosely through the block 14 of the shaft-arm 13, so as to operatively connect the block 23 of the link $p$ with the reverse-shaft.

Between the rocker-shafts V and $v$ and the valve-chests K and $k$ and above the valve-rods U and $u$ are two parallel shafts $x$ and $y$. (See Figs. 1, 2, 3, and 5.) The shafts $x$ and $y$ are parallel with the shafts $v$, V, and O and are consequently arranged transversely of the travel of the valve-rods U and $u$. Each of the shafts $x$ and $y$ is operatively provided with three depending arms—a power-receiving arm 35 and two power-transmitting arms 36 and 37, with both arms 36 and 37 considerably shorter than the arm 35 and with the arm 37 about twice as long as the arm 36.

The arm 36 of the shaft $x$ is connected, through the medium of two links 40 and 42, with the arm 37 of the shaft $y$. The link 40 is longer than the link 42 and depends from the said arm 36, to the lower end of which it is pivoted, as at 43. The link 40 is pivoted at its lower end, as at 44, to one end of the link 42, which is pivoted at its other end, as at 45, to the lower end of the arm 37 of the shaft $y$.

The arm 36 of the shaft $y$ is connected, through the medium of two links 50 and 52, with the arm 37 of the shaft $x$. The link 50 is longer than the link 52 and depends from the arm 36 of the shaft $y$. The link 50 is pivoted at its upper end, as at 53, to the lower end of the arm 36 of the shaft $y$ and is pivoted at its lower end, as at 54, to one end of the link 52, which is pivoted at its other end, as at 55, to the lower end of the arm 37 of the shaft $x$. The pivotal connections of the said links 40, 42, 50, and 52 are parallel with the shafts $x$ and $y$. The link 40 at any suitable point between the link 42 and the arm 36 of the shaft $x$ is directly operatively connected by a rod 46 with the upper end of the link P. The link 50 at any suitable point between the link 52 and the arm 36 of the shaft $y$ is directly operatively connected by a rod 56 with the lower end of the link $p$. The pivotal connections between the link 40 and the connected shaft-arm 37 and link 42, as well as the pivotal connections between the link 50 and the connected shaft-arm 37 and link 52, are arranged with their axes spaced apart a distance equal to the distance between the axes of the shafts $x$ and $y$. The arm 36 of the shaft $x$, centrally between the ends of the arm, is directly operatively connected by a rod 38 with the upper end of the link-hanger S. The arm 36 of the shaft $y$, centrally between the ends of the arm, is directly operatively connected by a rod 48 with the upper end of the link-hanger $s$. (See Figs. 1, 2, 4, and 5.)

The motion-receiving arm 35 of the shaft $x$ is operatively connected at its free end by a short link 39 with the cross-head E, and the motion-receiving arm 35 of the shaft $y$ is operatively connected at its free end by a correspondingly short link 49 with the cross-head $e$. (See Figs. 1, 2, 3, and 5.)

The members of the operative connection between the cross-head E and the shaft $x$ correspond in construction and relative arrangement with the members of the operative connection between the cross-head $e$ and the shaft $y$. The members of the operative connection between the link-hanger S and the shaft $x$ correspond in construction and relative arrangement with the members of the operative connection had between the link-hanger $s$ and the shaft $y$. The members employed in actuating the link-connecting rod 46 correspond in construction and relative arrangement with the members employed in actuating the link-connecting rod 56.

By the construction and arrangement of parts hereinbefore described it will be observed that the use of eccentrics or cranks in the link-motion for operating the valves is avoided, that the friction during the operation of the means establishing operative connection between each piston and the valve to be operated by power transmitted from the said piston is reduced to a minimum, and that my improved valve-gear is comparatively simple and inexpensive in construction, long-lived, and reliable in its operation.

I would here mention that the distributing-valves of all reciprocating engines have steam-lap. This indicates that such valves must be shifted out of a central position at the end of piston-stroke equal to the amount of lap and port-opening or preadmission of steam desired at the commencement of piston-stroke. This amount of valve travel in my improved valve-gear is received from the shorter shaft-arm 36, being the minimum valve travel of expansion-engines. The maximum valve travel is received from the longer shaft-arm 37. The minimum or reduced motion is obtained by the radius-rods U $u$ and link-blocks 23 in the center of links P $p$, as shown. Consequently in this position the cut-off takes effect at the commencement of piston-stroke. The farther the radius-rods are shifted out of the center of links the longer the valve travel, and therefore longer cut-off. By shifting the said radius-rods by the operation of the reverse-shaft from one extreme position along the link to the opposite extreme position the motion of the engine is reversed.

On account of irregularities in any reciprocating engine—as, for instance, slight variations in the length of connecting-rods—the piston of the engine at the middle of the stroke is a trifle nearer the crank than to the head-center. This irregularity effects the valve-motions of all engines and is overcome in my improved valve-gear by having the radius-rods exactly radial of the connected link when the engine is on its center.

In Fig. 2 the piston $c$ is at the commencement of its stroke, and the arm 35 of the shaft $y$, being operatively connected with the cross-head $e$, has turned the said shaft and brought the arms 36 and 37 of the said shaft into their extreme crank position. In this position it will be seen that the arm 36 of the shaft $y$ and the connected rod 48 have shifted the link-hanger $s$ to its extreme crank position a fixed amount, corresponding at the center of the link p to the lap of the valve m and port opening desired; but as the radius-rod u must be exactly radial of the link p when the piston c is on its center it is necessary to shift the link p through the medium of the rod 56, actuated through the medium of the arm 36 of the shaft y, arm 37 of the shaft x, and the links 50 and 52, which connect the said arms together. The valve m in this position of the link p has therefore been shifted out of its central position an amount equal to the lap and lead to admit steam at the crank end of the cylinder b, and in this position the radius-rods U and u may be shifted in either direction without disturbing the position of the said valve.

Suppose the piston C is at the middle of its stroke, as shown in Fig. 1. The arm 37 of the shaft x, being operatively connected with the said piston, is also at mid-stroke, holding the shaft x, with its two arms 36 and 37, in a central position. The arm 36 of the shaft x and the connected rod 38 then hold the link-hanger S in a central position; but as the piston C is in mid-stroke the link P must be turned on its center or fulcrum an amount corresponding to the full travel of the valve M to bring about a full port opening either for head or crank end of the cylinder B by operating the reverse-shaft for forward or backward motion. It will be seen that the arm 37 of the shaft y has transmitted, through links 40 and 42 and rod 48, the full crank-end motion, and the link P is in a position to produce a full port opening with the valve at either end of the cylinder by shifting the radius-rods in either forward or backward motion.

As the distance between the axes of the pivotal connections of both links 42 and 52 equals the distance from center to center of shafts x y, it will be seen that the points of connection between links 40 and 50 and the link-connecting rods 46 and 56 are placed as required to produce an amount of link travel out of the central position of the link equal to the amount of lap and lead desired of an engine at the commencement of stroke.

Although I have shown a double reversible engine, I would have it understood that my invention is not limited to a reversible engine, but broadly embraces any valve-gear comprising two parallel shafts provided, respectively, with a power-receiving arm and two power-transmitting arms, with the latter unequal in length and with the power-receiving arms of the shafts operatively connected with the pistons with a link connection between the shorter power-transmitting arm of each shaft and the longer power-transmitting arm of the other shaft, which link connection comprises two links, with one of the links pivoted at one end to one end of the other link and at its opposite end to the shorter shaft-arm, and with the last-mentioned link pivoted at its opposite end to the longer shaft-arm, with means for transmitting motion from one of the link connections to one of the valves and with means for transmitting motion from the other link connection to the other valve.

What I claim is—

1. In a valve-gear for a double engine operated by fluid under pressure, the combination, with the two valves and the two piston-operated cross-heads, of two parallel shafts provided respectively with a power-receiving arm and two power-transmitting arms, with the latter unequal in length and with the power-receiving arm of one of the shafts operatively connected with one of the cross-heads and with the power-receiving arm of the other shaft operatively connected with the other cross-head; a link connection between the shorter power-transmitting arm of each shaft and the longer power-transmitting arm of the other shaft, which link connection comprises two links of unequal length, with the longer link pivoted at one end to one end of the shorter link and at its opposite end to the shorter shaft-arm and with the shorter link pivoted at its opposite end to the longer shaft-arm; means for transmitting motion from the longer link of one of the link connections to one of the valves, and means for transmitting motion from the longer link of the other link connection to the other valve, and the axes of the pivotal connections of the shorter link of each link connection being spaced correspondingly with the distance between the axes of the shafts.

2. In a valve-gear for a double engine operated by fluid under pressure, the combination, with the two valves and the two pistons relatively arranged substantially as indicated, of two parallel shafts provided respectively with a power-receiving arm and two power-transmitting arms, with the latter unequal in length and with the power-receiving arm of one of the shafts operatively connected with one of the pistons and with the power-receiving arm of the other shaft operatively connected with the other piston; a link connection between the shorter power-transmitting arm of each shaft and the longer power-transmitting arm of the other shaft, which link connection comprises two links, with one of the links pivoted at one end to one end of the other link and at its opposite end to the shorter shaft-arm and with the last-mentioned link pivoted at its opposite end to the longer shaft-arm; means for transmitting motion from the first-mentioned link of one of the link connections to one of the valves, and means for transmitting motion from the first-mentioned link of the other link connection to the other valve, and the axes of the pivotal connections of the second-mentioned link of each link connection being spaced correspondingly with the distance between the axes of the shafts.

3. In a valve-gear for a double engine operated by fluid under pressure, the combination, with the two valves and the two pistons, of two parallel shafts provided respectively with a power-receiving arm and two power-transmitting arms, with the latter unequal in length and with the power-receiving arm of one of the shafts operatively connected with one of the pistons and with the power-receiving arm of the other shaft operatively connected with the other piston; a link connection between the shorter power-transmitting arm of each shaft and the longer power-transmitting arm of the other shaft, which link connection comprises two links, with one of the links pivoted at one end to one end of the other link and at its opposite end to the shorter shaft-arm and with the last-mentioned link pivoted at its opposite end to the longer shaft-arm; means for transmitting motion from one of the link connections to one of the valves, and means for transmitting motion from the other link connection to the other valve, all relatively arranged substantially as described and for the purpose set forth.

4. In a valve-gear for a double engine operated by fluid under pressure, the combination, with the two valves and the two piston-operated cross-heads, of two parallel shafts operatively connected with the piston and provided respectively with two power-transmitting arms unequal in length; an operative connection between the shafts and the cross-heads; a link connection between the shorter arm of each shaft and the longer arm of the other shaft, which link connection comprises two links of unequal length, with the longer link pivoted at one end to one end of the shorter link and at its opposite end to the shorter shaft-arm and with the shorter link pivoted at its opposite end to the longer shaft-arm; means for transmitting motion from the longer link of one of the link connections to one of the valves, and means for transmitting motion from the longer link of the other link connection to the other valve, and the axes of the pivotal connections of the shorter link of each link connection being spaced correspondingly with the distance between the axes of the shafts.

5. In a valve-gear for a double engine operated by fluid under pressure, the combination, with the two valves and the two pistons relatively arranged substantially as indicated, of two parallel shafts operatively connected with the shafts and provided respectively with two power-transmitting arms, a link connection between the shorter power-transmitting arm of each shaft and the longer power-transmitting arm of the other shaft, which link connection comprises two links, with one of the links pivoted at one end to one end of the other link and at its opposite end to the shorter shaft-arm and with the last-mentioned link pivoted at its opposite end to the longer shaft-arm; means for transmitting motion from the first-mentioned link of one of the link connections to one of the valves, and means for transmitting motion from the first-mentioned link of the other link connection to the other valve, and the axes of the pivotal connections of the second-mentioned link of each link connection being spaced correspondingly with the distance between the axes of the shafts.

6. In a valve-gear for a double engine operated by fluid under pressure, the combination, with the two valves and the two pistons, of two parallel shafts operatively connected with the piston and provided respectively with two power-transmitting arms unequal in length; a link connection between the shorter power-transmitting arm of each shaft and the longer power-transmitting arm of the other shaft, which link connection comprises two links, with one of the links pivoted at one end to one end of the other link and at its opposite end to the shorter shaft-arm and with the last-mentioned link pivoted at its opposite end to the longer shaft-arm; means for transmitting motion from one of the link connections to one of the valves, and means for transmitting motion from the other link connection to the other valve, all relatively arranged substantially as and for the purpose set forth.

7. In a valve-gear for a double reversible engine operated by fluid under pressure, the combination, with the pistons; the valves; the reverse-shaft having two arms spaced longitudinally of the shaft and projecting toward the valve-rods; the blocks pivoted to the shaft-arms; rods extending loosely through the said blocks and operatively connected with the valves; the pivotally-supported link-hangers; the links pivotally supported from the hangers, and the shiftable link-blocks pivoted to the rods and connected with the links, of the two parallel shafts operatively connected with the pistons and operatively provided respectively with two power-transmitting arms unequal in length; two rods establishing operative connection between the shorter power-transmitting arm of the different parallel shafts respectively and the different link-hangers respectively, and a link connection between the longer power-transmitting arm of each of the said parallel shafts and the shorter power-transmitting arm of the other of the said shafts, which link connection comprises two links of unequal length, with the longer link pivoted at one end to one end of the shorter link and at its opposite end to the shorter shaft-arm and with the shorter link pivoted at its opposite end to the longer shaft-arm; two rods operatively connecting the longer link of the different last-mentioned link connections respectively and the link of the different link-hangers respectively, all relatively arranged and operating substantially as and for the purpose set forth.

8. In a valve-gear for a double reversible engine operated by fluid under pressure, the combination, with the two pistons; the two valves; the reverse-shaft; two rods operatively connected with the reverse-shaft and with the different valves respectively; the two pivotally-supported link-hangers; two links pivotally supported from the different hangers respectively, and the shiftable link-blocks pivoted to the different rods respectively and connected with the different links respectively, of the two parallel shafts operatively connected with the piston and provided respectively with two power-transmitting arms unequal in length; two rods establishing operative connection between the shorter power-transmitting arm of the different parallel shafts respectively and the different link-hangers respectively; and a link connection between the longer power-transmitting arm of each of the said parallel shafts and the shorter arm of the other of the said shafts, which link connection comprises two links of unequal length, with the longer link pivoted at one end to one end of the shorter link and at its opposite end to the shorter shaft-arm and with the shorter link pivoted at its opposite end to the longer shaft-arm; two rods operatively connecting the longer link of the different last-mentioned link connections respectively with the link of the different link-hangers respectively, all relatively arranged and operating substantially as and for the purpose set forth.

9. In a valve-gear for a double reversible engine operated by fluid under pressure, the combination, with the cylinders B and $b$; the pistons C and $c$; the suitably-guided cross-heads E and $e$ operatively connected with the pistons C and $c$ respectively; the valve-chests K and $k$; the valves M and $m$; the valve-rods T and $t$ operatively connected with the valves M and $m$ respectively; the reverse-shaft; the rods U and $u$ operatively connected with the valve-rods T and $t$ respectively and with the reverse-shaft; the pivotally-supported link-hangers S and $s$; the links P and $p$ pivotally supported from the hangers S and $s$ respectively, and the two shiftable link-blocks pivoted to the rods U and $u$ respectively and connected with the links P and $p$ respectively, of the two parallel shafts $x$ and $y$ operatively provided respectively with a power-receiving arm 35 and two power-transmitting arms 36 and 37, with the power-receiving arms operatively connected with the cross-heads and with the power-transmitting arms unequal in length; the rods 38 and 48 establishing operative connection between the shorter power-transmitting arm of the shafts $x$ and $y$ respectively and the link-hangers S and $s$ respectively; the links 40 and 42; the rod 46; the links 50 and 52, and the rod 56, all relatively arranged and operating substantially as and for the purpose set forth.

10. In a valve-gear for a double reversible engine operated by fluid under pressure, the combination, with the cylinders B and $b$; the pistons C and $c$; the valve-chests K and $k$; the valves M and $m$; the valve-rods T and $t$ operatively connected with the valves M and $m$ respectively; the reverse-shaft; the rods U and $u$ operatively connected with the reverse-shaft; the rocker-shaft V having the arms 17 and 18; the rocker-shaft $v$ having the arms 27 and 28; the pivotally-supported link-hangers S and $s$; the links P and $p$ pivotally supported from the hangers S and $s$ respectively, and the two shiftable link-blocks pivoted to the rods U and $u$ respectively and connected with the links P and $p$ respectively, of the two parallel shafts $x$ and $y$ operatively connected with the pistons and provided respectively with two power-transmitting arms 36 and 37 unequal in length; the two rods 38 and 48 establishing operative connection between the shorter power-transmitting arm of the shafts $x$ and $y$ respectively and the link-hangers S and $s$ respectively; the links 40 and 42; the rod 46; the links 50 and 52 and the rod 56, all relatively arranged and operating substantially as and for the purpose set forth.

In testimony whereof I sign the foregoing specification in the presence of two witnesses.

THEODORE H. HABERKORN.

Witnesses:
BERTHA KRUDOP,
LODIE M. PRITCHARD.